US010900765B2

(12) United States Patent
Shimaoka et al.

(10) Patent No.: US 10,900,765 B2
(45) Date of Patent: Jan. 26, 2021

(54) FORM MEASURING APPARATUS

(71) Applicant: MITUTOYO CORPORATION, Kanagawa (JP)

(72) Inventors: Atsushi Shimaoka, Tokyo (JP); Kazuhiko Hidaka, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 228 days.

(21) Appl. No.: 16/207,706

(22) Filed: Dec. 3, 2018

(65) Prior Publication Data

US 2019/0170493 A1 Jun. 6, 2019

(30) Foreign Application Priority Data

Dec. 4, 2017 (JP) ................. 2017-232532

(51) Int. Cl.
*G01B 5/28* (2006.01)
*G01B 5/20* (2006.01)
*G01B 7/34* (2006.01)
*G01B 5/00* (2006.01)
*G01B 5/30* (2006.01)

(52) U.S. Cl.
CPC .......... *G01B 5/201* (2013.01); *G01B 5/0007* (2013.01); *G01B 5/0009* (2013.01); *G01B 5/20* (2013.01); *G01B 5/28* (2013.01); *G01B 7/34* (2013.01); *G01B 5/30* (2013.01)

(58) Field of Classification Search
CPC .......... G01B 5/20; G01B 5/28; G01B 5/0007; G01B 5/0009; G01B 7/28; G01B 7/34
See application file for complete search history.

(56) References Cited

U.S. PATENT DOCUMENTS

| 5,245,863 | A | * | 9/1993 | Kajimura | ............... | G01Q 20/02 |
| | | | | | | 356/613 |
| 6,314,800 | B1 | * | 11/2001 | Nishimura | ............ | G01B 3/008 |
| | | | | | | 33/551 |
| 6,365,895 | B1 | * | 4/2002 | Yamamoto | ............ | B82Y 35/00 |
| | | | | | | 850/52 |
| 9,528,824 | B2 | | 12/2016 | Bos et al. | | |
| 2002/0152795 | A1 | * | 10/2002 | Guerra-Vela | ......... | G01Q 30/04 |
| | | | | | | 73/1.89 |
| 2005/0150280 | A1 | * | 7/2005 | Tang | ..................... | G01Q 20/04 |
| | | | | | | 73/105 |
| 2006/0123895 | A1 | * | 6/2006 | Lee | ........................ | B82Y 35/00 |
| | | | | | | 73/105 |
| 2006/0277981 | A1 | * | 12/2006 | Ohta | ...................... | B82Y 35/00 |
| | | | | | | 73/105 |

(Continued)

FOREIGN PATENT DOCUMENTS

JP 04369418 A * 12/1992
JP 2014-167435 A 9/2014

*Primary Examiner* — Christopher W Fulton (74) *Attorney, Agent, or Firm* — Greenblum & Bernstein, P.L.C.

(57) ABSTRACT

A form measuring apparatus includes a base; an arm capable of swinging relative to the base; a coupler coupling the base and the arm, and having a deformation region that is capable of elastic deformation between the base and the arm; and a distortion detector installed in the deformation region. In the form measuring apparatus, a stylus is mounted to the arm and can slide along a surface of a work piece.

21 Claims, 5 Drawing Sheets

(56) References Cited

U.S. PATENT DOCUMENTS

| | | | |
|---|---|---|---|
| 2008/0011065 A1* | 1/2008 | Su | G01Q 10/045 |
| | | | 73/105 |
| 2008/0022759 A1* | 1/2008 | Su | G01Q 30/04 |
| | | | 73/105 |
| 2008/0048114 A1* | 2/2008 | Ookubo | G01Q 60/32 |
| | | | 250/306 |
| 2008/0295584 A1* | 12/2008 | Cantrell | G01Q 60/32 |
| | | | 73/105 |
| 2014/0237834 A1 | 8/2014 | Matsumiya et al. | |
| 2014/0283402 A1* | 9/2014 | Hidaka | G01B 5/28 |
| | | | 33/556 |

* cited by examiner

FORM MEASURING APPARATUS

CROSS-REFERENCE TO RELATED APPLICATIONS

The present application claims priority under 35 U.S.C. § 119 of Japanese Application No. 2017-232532, filed on Dec. 4, 2017, the disclosure of which is expressly incorporated by reference herein in its entirety.

BACKGROUND OF THE INVENTION

1. Field of the Invention

The present invention relates to a form measuring apparatus that measures a surface form of a work piece.

2. Description of Related Art

In order to measure a surface form of a work piece, a contact-type form measuring apparatus exists which slides a stylus along a surface of the work piece and detects deviation of the surface. For example, Japanese Patent Laid-open Publication No. 2014-167435 discloses a form measuring apparatus that includes an arm that rotates freely centered on a pivot point, a stylus that is mounted to a first end of the arm, and a detection device that detects displacement of a second end of the arm. In this form measuring apparatus, when the stylus displaces along the surface of the work piece, the arm rotates in a lever-like manner centered on the pivot point, and the second end of the arm displaces. Accordingly, based on the displacement of the second end of the arm that is detected by the detection device, the displacement of the stylus can be detected, and thereby the surface form of the work piece can be measured.

In Japanese Patent Laid-open Publication No. 2014-167435 discussed above, and other publications, in a conventional form measuring apparatus where an arm rotates in a lever-like manner, a differential transformer method is often used as the detection device detecting displacement of the second end of the arm. In the differential transformer method, when the stylus displaces, a movable core mounted to the second end of the arm changes position relative to two coils that are connected to each other. By detecting a differential voltage of the coils at this point, the amount of displacement of the stylus can be found. However, in a differential transformer-type detection device of this kind, detection sensitivity can change substantially due to slight shifts in position of the structural components. Therefore, positioning the structural components is difficult, and a great deal of design know-how is necessary to configure a form measuring apparatus having a desired resolution or measurement range.

SUMMARY OF THE INVENTION

An advantage of the present invention provides a contact-type form measuring apparatus that is capable of achieving a desired resolution and measurement range simply.

A form measuring apparatus according to the present invention includes a base; an arm capable of swinging relative to the base; a coupling member coupling the base and the arm, and having a deformation region that is capable of elastic deformation between the base and the arm; and a distortion detecting element installed in the deformation region.

With such a configuration, a stylus mounted to the arm can slide along a surface of a work piece. When the stylus displaces along the surface of the work piece, the arm swings and stress from the arm swinging is applied to the coupling member, and the deformation region of the coupling member undergoes elastic deformation. An amount of deformation of the deformation region corresponds to an amount of displacement of the stylus. Accordingly, in the form measuring apparatus according to the present invention, based on the amount of deformation of the deformation region that is detected by the distortion detecting element, the amount of displacement of the stylus can be detected, and thereby a surface form of the work piece can be measured.

In this example, the amount of deformation of the deformation region of the coupling member differs depending on a position in a coupling direction of the base and the arm within the deformation region. Specifically, in the deformation region of the coupling member, the closer the position is to the base in the coupling direction of the base and the arm, the greater the stress that is applied. Thus, the deformation region deforms more the closer a location is to the base, and deforms less the closer the location is to the arm. Therefore, the placement of the distortion detecting element within the deformation region affects the detection sensitivity for detecting displacement of the stylus.

For example, when the distortion detecting element is installed at a location in the deformation region that is closer to the base, even a slight displacement of the stylus can be detected as deformation of the coupling member, and therefore the detection sensitivity for displacement of the stylus is increased. Thus, a high-resolution can be achieved in the form measuring apparatus of the present invention. Meanwhile, when the distortion detecting element is installed at a location in the deformation region that is closer to the arm, deformation of the coupling member is unlikely to be detected for a slight displacement of the stylus, and therefore the detection sensitivity for displacement of the stylus is inhibited. Thus, the form measuring apparatus according to the present invention becomes capable of long stroke detection for displacement of the stylus, and its measurement range is broadened. Therefore, by adjusting the installation position of the distortion detecting element within the deformation region of the coupling member during manufacture or calibration of the form measuring apparatus according to the present invention, for example, a desired resolution and measurement range can be achieved simply.

In the form measuring apparatus according to the present invention, preferably, the coupling member is formed of an elastic material, and the form measuring apparatus further includes a distance adjustment mechanism that adjusts a distance between the base and the arm. With such a configuration, the coupling member is formed of an elastic material, and therefore a location on the coupling member that is located between the base and the arm creates the deformation region. Given this, by adjusting the distance between the base and the arm using the distance adjustment mechanism, the length of the deformation region in the coupling direction of the base and the arm is increased and decreased, and the amount of deformation of the deformation region relative to the amount of displacement of the stylus is modified. Thus, the detection sensitivity for the displacement of the stylus can be readily adjusted.

The form measuring apparatus according to the present invention may further include a placement adjustment mechanism that adjusts a position of the distortion detecting element within the deformation region in the coupling direction of the base and the arm. According to the placement adjustment mechanism, the position of the distortion detecting element within the deformation region can be adjusted so as to be closer to the base or closer to the arm. Thus, the detection sensitivity for the displacement of the stylus can be readily adjusted.

In the form measuring apparatus according to the present invention, preferably, the coupling member is formed of an elastic material, and the form measuring apparatus further includes a confining member that constrains elastic deformation of the coupling member in a portion between the base and the arm. With such a configuration, the coupling member is formed of an elastic material, and therefore a location on the coupling member that is located between the base and the arm creates the deformation region. Meanwhile, a location where deformation is constrained by the confining member is excluded from the deformation region. Thus, by mounting the confining member to the coupling member, the deformation of a portion of the coupling member can be constrained, and the length of the deformation region in the coupling direction of the base and the arm can be shortened. Accordingly, the amount of deformation of the deformation region relative to the amount of displacement of the stylus can be increased and the detection sensitivity for the displacement of the stylus can be easily increased. Such a confining member may be configured to enable adjustment of a range where elastic deformation of the coupling member is constrained, in the coupling direction of the base and the arm. For example, a plurality of confining members having various lengths in the coupling direction of the base and the arm may be prepared, and a suitable confining member may be selected and used. Also, the confining member may be displaced in the coupling direction of the base and the arm.

In the form measuring apparatus according to the present invention, preferably, the coupling member is at least one plate spring, a middle portion of which configures the deformation region. According to this configuration, the configuration of the coupling member is simple, and therefore installation of the distortion detecting element becomes easier. Also, the coupling member can be configured by at least one plate spring, but by adjusting the number of plate springs, the force required to bend the coupling member can be modified.

In the form measuring apparatus according to the present invention, preferably, the coupling member includes at least one pair of the plate springs that are intersectingly arranged. With this configuration, torsion or the like of the plate springs is prevented, and therefore the) distortion detecting element can detect the amount of deformation of the plate springs with a higher degree of accuracy.

In the form measuring apparatus according to the present invention, preferably, the distortion detecting element is a piezoelectric element installed on each of a pair of surfaces of the plate spring, and configures one or more pairs having the plate spring sandwiched therebetween. According to this configuration, the piezoelectric elements configuring the pair configure bimorph-type distortion detecting elements that are joined with the plate spring interposed therebetween, and therefore the amount of deformation of the plate spring can be detected with a higher degree of accuracy.

The form measuring apparatus according to the present invention preferably further includes a driver that is installed in the deformation region and that drives deformation of the coupling member. With such a configuration, by driving deformation of the coupling member, the driver can withdraw the stylus, which is in a state of contact with the work piece, from the work piece. Furthermore, by driving deformation of the coupling member, the driver can control a measurement force while the stylus is in contact with the work piece. For example, when the work piece is a soft material or when conducting a high-precision measurement, the driver preferably drives deformation of the coupling member so as to decrease the measurement force. Meanwhile, when a highly responsive measurement is sought, the driver preferably drives deformation of the coupling member so as to increase the measurement force. For example, a piezoelectric element can be used as such a driver.

The present invention can provide a contact-type form measuring apparatus that is capable of achieving a desired resolution and measurement range simply.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings.

First Embodiment

Figure 1:
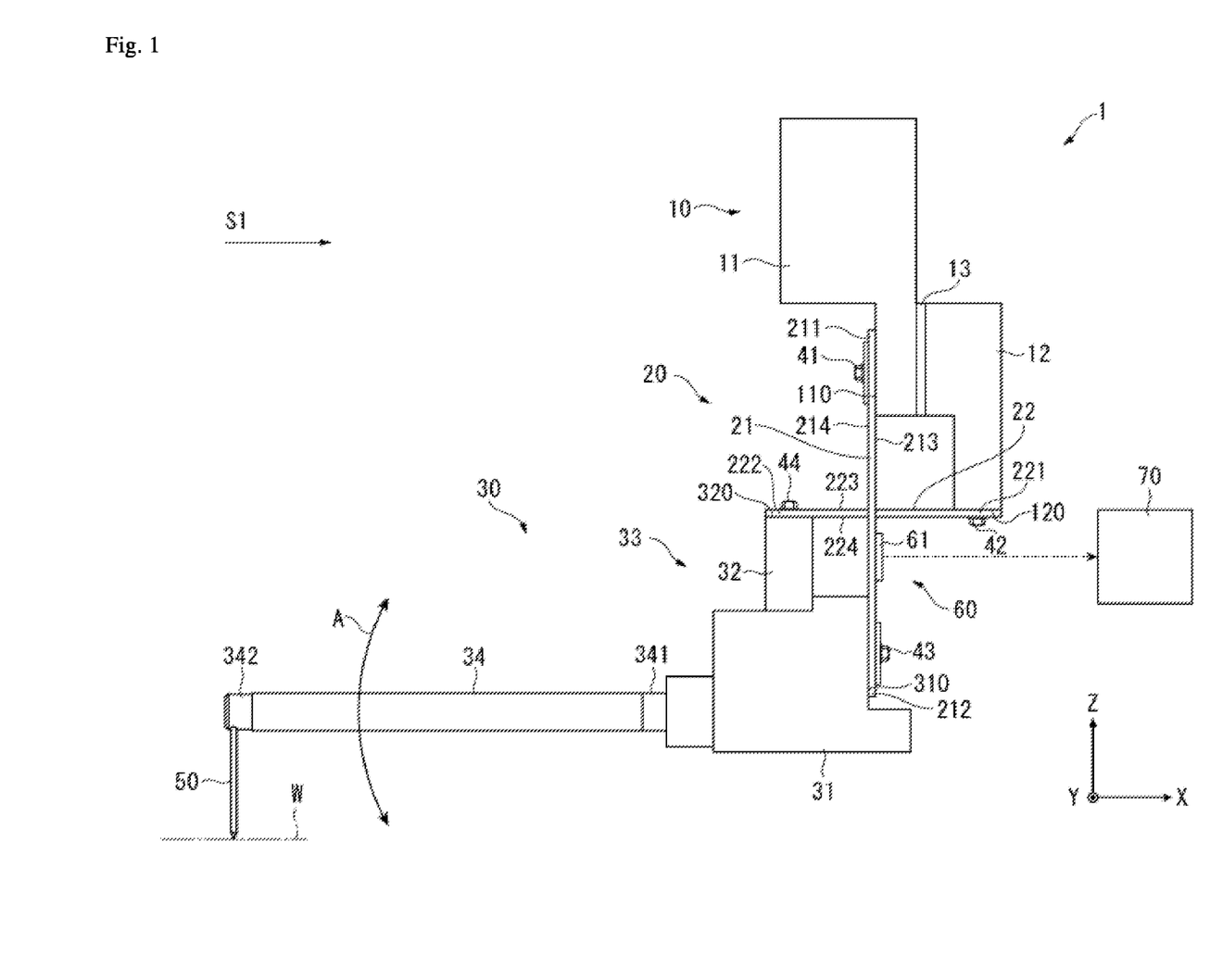
FIG. 1 is a schematic view illustrating a form measuring apparatus according to a first embodiment of the present invention.
Figure 2:
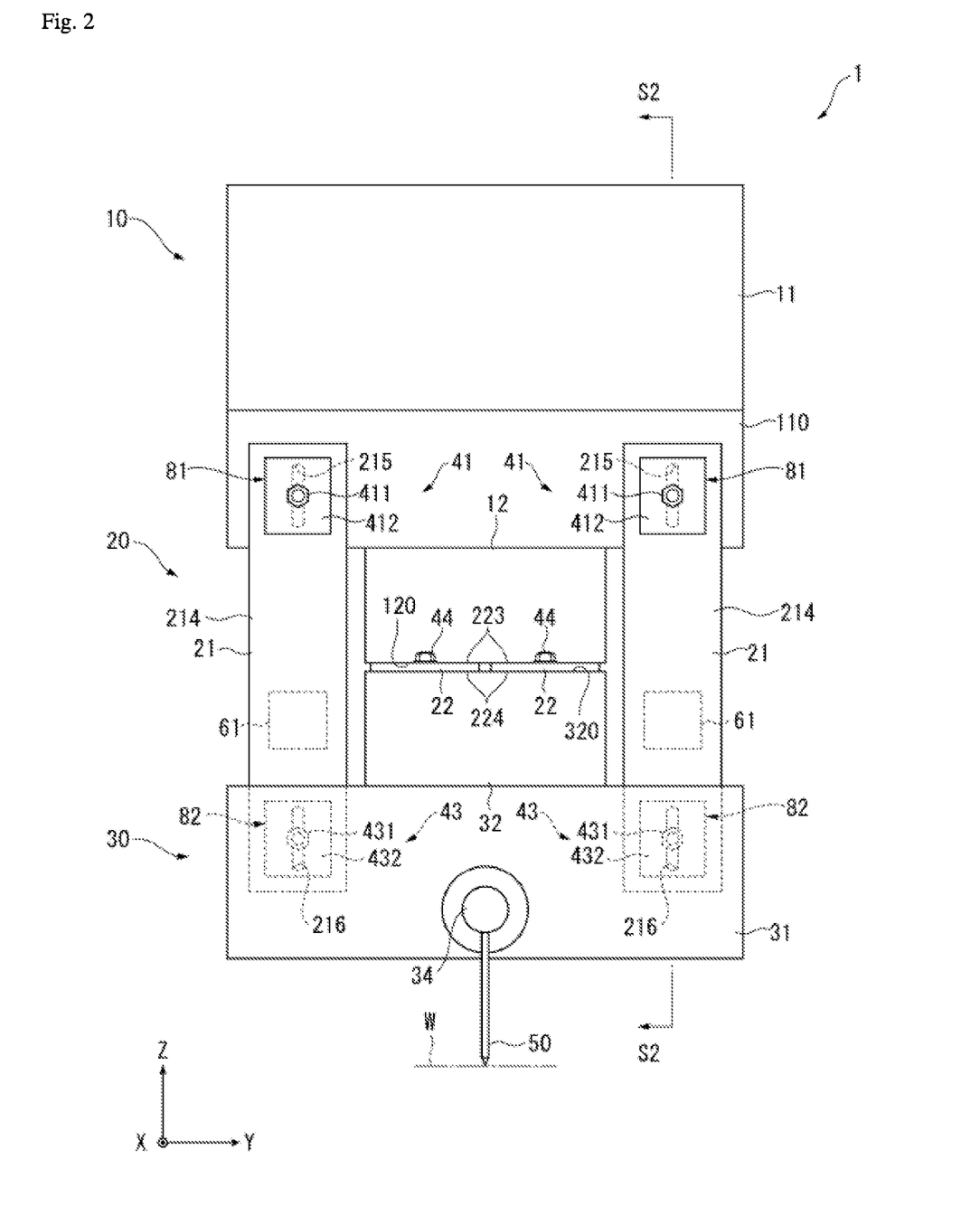
FIG. 2 is a schematic view of the form measuring apparatus of FIG. 1 from an S1 direction.
Figure 3:
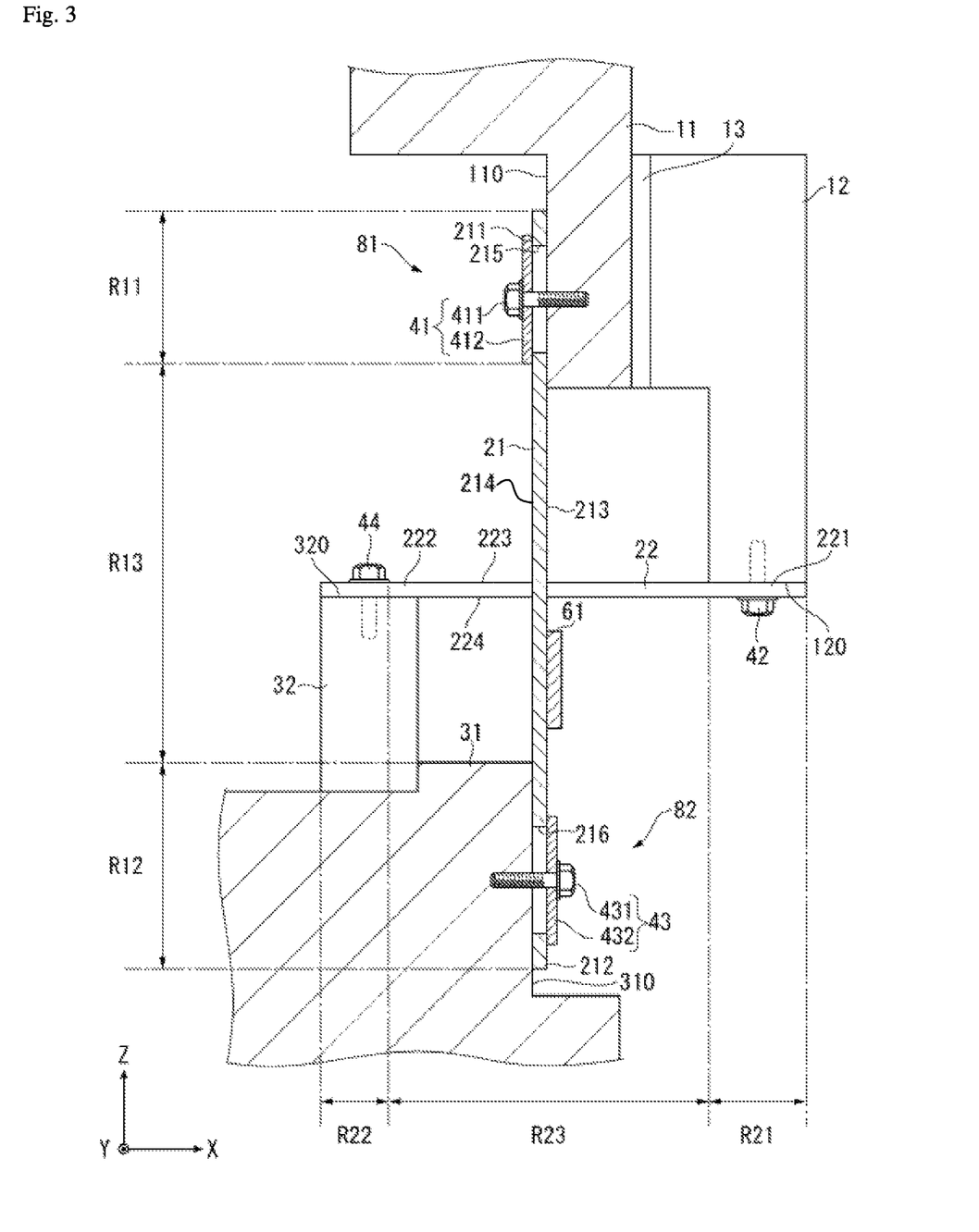
FIG. 3 is a cross-sectional view along an arrow indicated by line S2 in FIG. 2, providing a schematic view illustrating relevant portions of the first embodiment.

FIGS. 1 to 3 illustrate a first embodiment according to the present invention. A form measuring apparatus 1 uses a stylus 50 that is capable of sliding along a work piece W to measure a surface form of the work piece W. For example, the work piece W is arranged parallel to an XY plane (horizontal plane) and the form measuring apparatus 1 performs a measurement operation in which the stylus 50 is brought into contact with a surface of the work piece W, after which the stylus 50 is displaced relative to the work piece W in a direction parallel to the XY plane. Then, Z direction (perpendicular direction) displacement of the stylus 50 during the measurement operation is detected, whereby the surface form of the work piece W is measured.

An overall configuration of the form measuring apparatus 1 is described with reference to FIGS. 1 and 2. The form measuring apparatus 1 includes a base 10, a coupling member (coupler) 20, an arm 30, the stylus 50, and a distortion detector 60. In addition, a control device 70 that is capable of controlling operations of the form measuring apparatus 1 is connected to the form measuring apparatus 1.

The base 10 is, for example, fixed to a feeding mechanism (feeder) or the like that is installed near a placement stage of the work piece W and includes a first base portion 11, a second base portion 12, and a Z axis adjustment mechanism (Z axis adjuster) 13. The first base portion 11 includes a vertical support surface 110 that is parallel to a YZ plane and faces toward the stylus 50. A first end 211 of a plate spring 21 (described below) is fixed to the vertical support surface 110 by a fixating member 41, such as a screw. The second base portion 12 is coupled to the first base portion 11 via the Z axis adjustment mechanism 13. Furthermore, the second base portion 12 includes, below the vertical support surface 110 of the first base portion 11, a horizontal support surface 120 that is parallel to the XY plane and faces downward. A first end 221 of a plate spring 22 (described below) is fixed to the horizontal support surface 120 by a fixating member 42, such as a screw.

The Z axis adjustment mechanism 13 is a mechanism that is capable of adjusting the Z direction placement of the second base portion 12 relative to the first base portion 11. The Z axis adjustment mechanism 13 is not particularly limited, but can be configured using a guide rail or the like, for example. During the measurement operation of the form measuring apparatus 1, the Z axis adjustment mechanism 13 is capable of fixing the placement of the second base portion 12 relative to the first base portion 11.

The coupling member 20 includes at least one pair (two pairs in the present embodiment) of the plate springs 21 and 22, which are intersectingly arranged so as to configure what is called a cross plate spring. The coupling member 20 couples the base 10 with the arm 30. The plate springs 21 and 22 are formed of an elastic material, and act as a sort of elastic hinge, swingably supporting the arm 30. The plate spring 21 is arranged so as to follow the Z direction, and includes a pair of surfaces 213 and 214, which are substantially parallel to the YZ plane and are capable of flexing. Furthermore, the plate spring 21 couples the first base portion 11 with a first arm portion 31 (described below) in the Z direction. Meanwhile, the plate spring 22 is arranged so as to follow the X direction, and includes a pair of surfaces 223 and 224, which are substantially parallel to the XY plane and are capable of flexing. Also, the plate spring 22 couples the second base portion 12 with a second arm portion 32 (described below) in the X direction. In the present embodiment, in the two pairs of plate springs 21 and 22, the plate spring 22 is arranged facing inward and the plate spring 21 is arranged facing outward along the Y direction (see FIG. 2).

The arm 30 is supported by the coupling member 20, and is freely swingable in the Z direction (see arrow A in FIG. 1). The arm 30 includes a block body 33, which includes the first arm portion 31 and the second arm portion 32, and a stick-like portion 34.

The first arm portion 31 is configured in a block shape that includes a vertical support surface 310 that is parallel to the YZ plane and faces in an opposite direction away from the stylus 50. A second end 212 of the plate spring 21 is fixed to the vertical support surface 310 by a fixating member 43, such as a screw. The second arm portion 32 is configured in a block shape that projects above the first arm portion 31. Furthermore, the second arm portion 32 includes, above the vertical support surface 310 of the first arm portion 31, a horizontal support surface 320 that is parallel to the XY plane and faces upward. A second end 222 of the plate spring 22 is fixed to the horizontal support surface 320 by a fixating member 44, such as a screw. The block body 33, which includes the first arm portion 31 and the second arm portion 32, may be formed integrally.

The stick-like portion 34 has a first end 341 connected to the first arm portion 31 and extends in the X direction from the first arm portion 31. The stylus 50 is attached to the second end 342 of the stick-like portion 34.

The stylus 50 is attached to the second end 342 of the stick-like portion 34, and extends downward in the Z direction from the second end 342. In addition, the stylus 50 is supported by the coupling member 20, via the arm 30, and is freely swingable in the Z direction.

The distortion detector 60 includes a distortion detecting element (distortion detector) 61 that is provided to each of the plate springs 21. The distortion detecting element 61 is a strain gage or piezoelectric element, for example, and is fixed by an adhesive or the like to a deformation region R13 (described below; see FIG. 3) on one of the surfaces (213) of the plate spring 21. In addition, the distortion detecting element 61 detects an amount of deformation at a location on the plate spring 21 where the distortion detecting element 61 is installed, and outputs the detection results to the control device 70. In this example, the amount of deformation of the plate spring 21 corresponds to the amount of displacement of the stylus 50. Specifically, in the form measuring apparatus 1, the displacement of the stylus 50 during the measurement operation can be detected as deformation of the plate spring 21.

The control device 70 is configured using a personal computer or the like, and controls operations of the form measuring apparatus 1 based on a program that is stored ahead of time. Also, the control device 70 calculates the amount of displacement of the stylus 50 based on the amount of deformation of each of the plate springs 21, which is input from the deformation detector 60. For example, the control device 70 may acquire the amount of deformation of each of the plate springs 21 from the deformation detector 60, and calculate the amount of displacement of the stylus 50 based on an average value for the amounts of deformation. Then, based on the position of the stylus 50 relative to the work piece W and the amount of displacement of the stylus 50 associated with this position, the control device 70 performs various computations in accordance with measurement objectives for the work piece W.

During the measurement operation of the form measuring apparatus 1, when the stylus 50 displaces in the Z direction along the surface of the work piece W, the arm 30 oscillates with the side of the arm 30 that is supported by the coupling member 20 as the pivot point. At this point, the coupling member 20 is subjected to stress by the arm 30, and thereby each of the plate springs 21 and 22 which configure the coupling member 20 elastically bend (undergo elastic deformation) in accordance with the amount of displacement of the stylus 50.

In this example, when the surface of the work piece W deviates upward in the Z direction, the plate spring 21 elastically deforms such that the surface 213 undergoes warping deformation and the surface 214 undergoes bending deformation. Meanwhile, the plate spring 22 elastically deforms such that the surface 223 undergoes bending deformation and the surface 224 undergoes warping deformation. When the surface of the work piece W deviates downward in the Z direction, the elastic deformation of the plate springs 21 and 22 returns to its original state. Thus, the form measuring apparatus 1 preferably initiates the measurement operation from a state where the stylus 50 is already pressed against the surface of the work piece W and the coupling member 20 is slightly deformed.

Next, a more concrete configuration of the coupling member 20 is further described with reference to FIG. 3. Each of the plate springs 21 configuring the coupling member 20 is divided into a fixed region R11, where deformation is constrained on the first base portion 11 side; a fixed region R12 where deformation is constrained on the first arm portion 31 side; and the deformation region R13 that is capable of elastic deformation, positioned between the fixed regions R11 and R12. Likewise, each of the plate springs 22 configuring the coupling member 20 is divided into a fixed region R21, where deformation is constrained on the second base portion 12 side; a fixed region R22 where deformation is constrained on the second arm portion 32 side; and a deformation region R23 that is capable of elastic deformation, positioned between the fixed regions R21 and R22.

In the present embodiment, the fixed regions R11. R12, R21, and R22 are regions where deformation is constrained, at least during the measurement operation of the form measuring apparatus 1. For example, in the plate spring 21, the fixed region R11 is defined by the placement of the fixating member 41 (a washer 412) that is tightly fitted to the surface 214, whereas the fixed region R12 is defined by the placement of the first arm portion 31 that is tightly fitted to the surface 214. Also, in the plate spring 22, the fixed region R21 is defined by the placement of the second base portion 12 that is tightly fitted to the surface 223, whereas the fixed region R22 is defined by the placement of the fixating member 44 that is tightly fitted to the surface 223.

In this example, the amount of deformation of the deformation regions R13 and R23 during the measurement operation of the form measuring apparatus 1 differs depending on a Z direction position in the deformation regions R13 and R23. Specifically, in the deformation regions R13 and R23, the closer to the base 10 that supports the plate springs 21 and 22, the greater the stress that is applied. Thus, the deformation regions R13 and R23 deform more the closer the location is to the base 10, and deform less the closer the location is to the arm 30.

Accordingly, the placement of the distortion detecting element 61 within the deformation region R13 of the plate spring 21 affects the detection sensitivity for detecting displacement of the stylus 50. For example, when the distortion detecting element 61 is placed at a location in the deformation region R13 that is closer to the base 10, even a slight displacement of the stylus 50 can be detected as deformation of the plate spring 21, and therefore the detection sensitivity for displacement of the stylus 50 is increased. Thus, a high-resolution can be achieved in the form measuring apparatus 1. Meanwhile, when the distortion detecting element 61 is placed at a location in the deformation region R13 that is closer to the arm 30, deformation of the plate spring 21 is unlikely to be detected for a slight displacement of the stylus 50, and therefore the detection sensitivity for displacement of the stylus 50 is inhibited.

Thus, the form measuring apparatus 1 becomes capable of long stroke detection and its measurement range is broadened.

The form measuring apparatus 1 according to the present embodiment further includes two distance adjustment mechanisms (distance adjusters) 81 and 82 that can adjust a distance between the base 10 and the arm 30. The distance adjustment mechanisms 81 and 82 are now described.

The distance adjustment mechanism 81 includes a Z direction slit 215 that is formed in the first end 211 of the plate spring 21, and the fixating member 41. The fixating member 41 includes a screw 411 that is inserted through the slit 215 and threadably engages with the first base portion 11, and a washer 412 that receives the threading engagement force of the screw 411 and presses the first end 211 of the plate spring 21 against the first base portion 11. The distance adjustment mechanism 81 adjusts the Z direction placement of the plate spring 21 relative to the first base portion 11 by adjusting a Z direction insertion position of the screw 411 relative to the slit 215.

The distance adjustment mechanism 82 has a configuration similar to that of the distance adjustment mechanism 81 and includes a Z direction slit 216 that is formed in the second end 212 of the plate spring 21, and the fixating member 43. The fixating member 43 includes a screw 431 and a washer 432. The distance adjustment mechanism 82 adjusts the Z direction placement of the plate spring 21 relative to the first arm portion 31 by adjusting the Z direction insertion position of the screw 431 relative to the slit 216.

According to at least one of the distance adjustment mechanisms 81 and 82, by displacing the plate spring 21 in the Z direction relative to the first base portion 11 or the first arm portion 31, the distance between the first base portion 11 and the first arm portion 31 is adjusted (modified). In this example, on the plate spring 21, a region located between the first base portion 11 and the first arm portion 31 creates the deformation region R13. Accordingly, by adjusting the distance between the first base portion 11 and the first arm portion 31, the Z direction length of the deformation region R13 on the plate spring 21 can be increased or decreased. As a result, the amount of deformation of the deformation region R13 relative to the amount of displacement of the stylus 50 can be adjusted and the detection sensitivity for the displacement of the stylus 50 can be adjusted.

For example, when the Z direction length of the deformation region R13 is shortened, the amount of deformation of the deformation region R13 relative to the amount of displacement of the stylus 50 increases, and therefore the detection sensitivity for the displacement of the stylus 50 improves. Meanwhile, when the Z direction length of the deformation region R13 is lengthened, the amount of deformation of the deformation region R13 relative to the amount of displacement of the stylus 50 decreases, and therefore the detection sensitivity for the displacement of the stylus 50 is inhibited.

In the present embodiment, when modifying the distance between the first base portion 11 and the first arm portion 31, to which is fixed the plate spring 21, the Z direction distance between the second base portion 12 and the second arm portion 32, to which is fixed the plate spring 22, must remain constant. Therefore, the Z direction position of the second base portion 12 relative to the first base portion 11 is preferably adjusted using the Z axis adjustment mechanism 13.

In the present embodiment, the two distance adjustment mechanisms 81 and 82 configure a placement adjustment mechanism (placement adjuster) of the present invention. Specifically, by displacing the coupling member 20 in the same direction relative to each of the base 10 and the arm 30 using the two distance adjustment mechanisms 81 and 82, the placement in the Z direction (coupling direction of the base 10 and the arm 30) of the distortion detecting element 61 within the deformation region R13 can also be modified while the Z direction length of the deformation region R13 remains unchanged.

For example, by displacing the coupling member 20 upward relative to each of the base 10 and the arm 30, the placement of the distortion detecting element 61 within the deformation region R13 displaces toward the base 10. Accordingly, the detection sensitivity for the displacement of the stylus 50 improves. Meanwhile, by displacing the coupling member 20 downward relative to each of the base 10 and the arm 30, the placement of the distortion detecting element 61 within the deformation region R13 displaces toward the arm 30. Accordingly, the detection sensitivity for the displacement of the stylus 50 is inhibited.

Effects of the First Embodiment

In the present embodiment, as described above, the placement of the distortion detecting element 61 within the deformation region R13 of the plate spring 21 affects the detection sensitivity for the displacement of the stylus 50. Therefore, by adjusting the installation position of the distortion detecting element 61 within the deformation region R13 of the plate spring 21 during manufacture or calibration of the form measuring apparatus 1, for example, a desired resolution and measurement range can be achieved simply.

Also, according to at least one of the distance adjustment mechanisms 81 and 82 of the present embodiment, by adjusting the distance between the first base portion 11 and the second arm portion 32, the Z direction length of the deformation region R13 on the plate spring 21 can be increased or decreased. This modifies the amount of deformation of the deformation region R13 relative to the amount of displacement of the stylus 50. Thus, the detection sensitivity for the displacement of the stylus 50 can be readily modified while the distortion detecting element 61 remains mounted in the deformation region R13.

Also, the two distance adjustment mechanisms 81 and 82 of the present embodiment configure the placement adjustment mechanism which adjusts the position of the distortion detecting element 61 within the deformation region R13 in the Z direction. According to the distance adjustment mechanisms 81 and 82, the position of the distortion detecting element 61 within the deformation region R13 can be adjusted so as to be closer to the first base portion 11, or closer to the first arm portion 31. Thus, the detection sensitivity for the displacement of the stylus 50 can be readily modified.

In addition, in the present embodiment, the coupling member 20 includes at least one of the plate springs 21 and 22, which contain the deformation regions R13 and R23 at the respective middle portions thereof. Therefore, the distortion detecting element 61 can be readily installed on at least one of the pair of surfaces 213 and 214 of the plate spring 21 (the surface 213 in the present embodiment). Also, by adjusting the number of plate springs 21 and 22 that configure the coupling member 20, the force required to bend the coupling member 20 can be modified.

Furthermore, the coupling member 20 of the present embodiment includes the pair of plate springs 21 and 22 which are intersectingly arranged, therefore preventing torsion or the like of the pair of plate springs 21 and 22. Thus, the distortion detecting element 61 can detect the amount of deformation of the deformation region R13 of the plate spring 21 with an even higher degree of accuracy.

Second Embodiment

Figure 4:
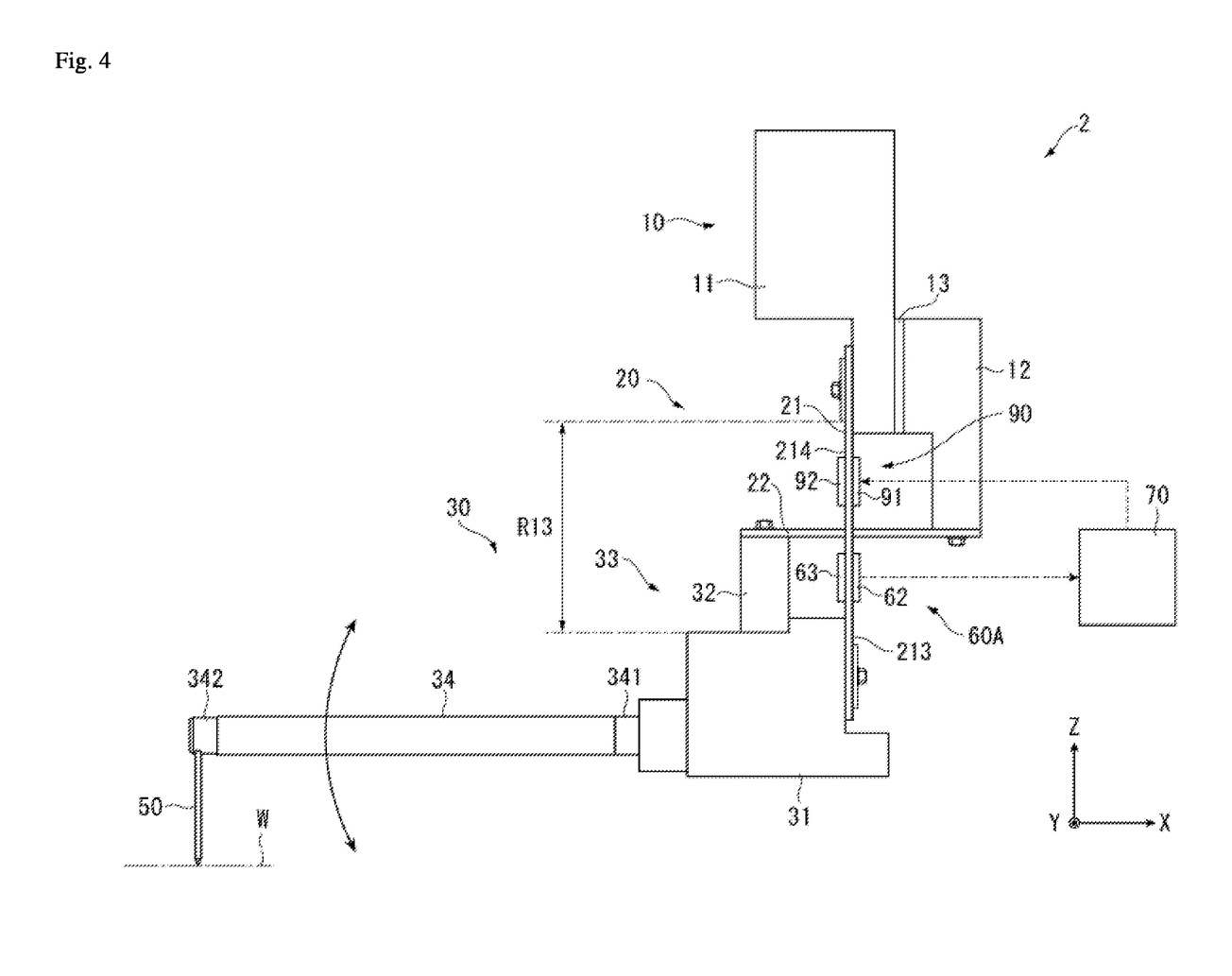
FIG. 4 is a schematic view illustrating a form measuring apparatus according to a second embodiment of the present invention.

FIG. 4 illustrates a form measuring apparatus 2 according to a second embodiment of the present invention. The form measuring apparatus 2 has the same basic structure as the form measuring apparatus 1 according to the first embodiment, described above. Therefore, duplicative descriptions of shared components are omitted and only those components that are differentiated are described below.

In the present embodiment, a distortion detector 60A includes at least a pair (one pair in the present embodiment) of distortion detecting elements 62 and 63 that are provided to each of the plate springs 21 in the deformation region R13. The distortion detecting elements 62 and 63 are piezoelectric elements that are respectively arranged on the pair of surfaces 213 and 214 of the plate spring 21 and configure a pair having the plate spring 21 therebetween. The distortion detecting elements 62 and 63 configure bimorph-type piezoelectric elements for detection that are joined to each other with the plate spring 21 interposed therebetween.

With such a configuration, during the measurement operation of the form measuring apparatus 2, the first distortion detecting element 62 can detect the amount of warping deformation of the surface 213 of the plate spring 21 and the second distortion detecting element 63 can detect the amount of bending deformation of the surface 214 of the plate spring 21. Thus, by utilizing dissimilarities in the amounts detected by the pair of distortion detecting elements 62 and 63, the amount of displacement of the stylus 50 can be more accurately detected.

Also, the form measuring apparatus 2 according to the present embodiment includes a driver 90 that drives deformation of the coupling member 20. The driver 90 includes a pair of drive elements 91 and 92, which are installed in the deformation region R13 of the plate spring 21. The pair of drive elements 91 and 92 are respectively installed on the pair of surfaces 213 and 214 of the plate spring 21 and configure bimorph-type piezoelectric elements for driving that are joined to each other with the plate spring 21 interposed therebetween.

With such a configuration, the control device 70 sends a differential voltage to the pair of drive elements 91 and 92, thereby operating the drive elements 91 and 92 so as to cause bending in the plate spring 21. This drives deformation of the coupling member 20. The pair of drive elements 91 and 92 are preferably installed closer to the base 10 (further upward) than the pair of distortion detecting elements 62 and 63 in view of efficiency for the force causing bending in the plate spring 21.

By driving deformation of the coupling member 20, the driver 90 can perform an operation of withdrawing the stylus 50, which is in a state of contact with the work piece W, from the work piece W, for example. Furthermore, by driving deformation of the coupling member 20, the driver 90 can control a measurement force while the stylus 50 is in contact with the work piece W. For example, when the work piece W is a soft material or when conducting a high-precision measurement, the driver 90 preferably drives deformation of the coupling member 20 so as to decrease the measurement force. Meanwhile, when a highly responsive measurement is sought, the driver 90 preferably drives deformation of the coupling member 20 so as to increase the measurement force. In addition, the driver 90 configures a bimorph-type piezoelectric element for driving, and therefore can drive the coupling member 20 with favorable responsiveness.

Third Embodiment

Figure 5:
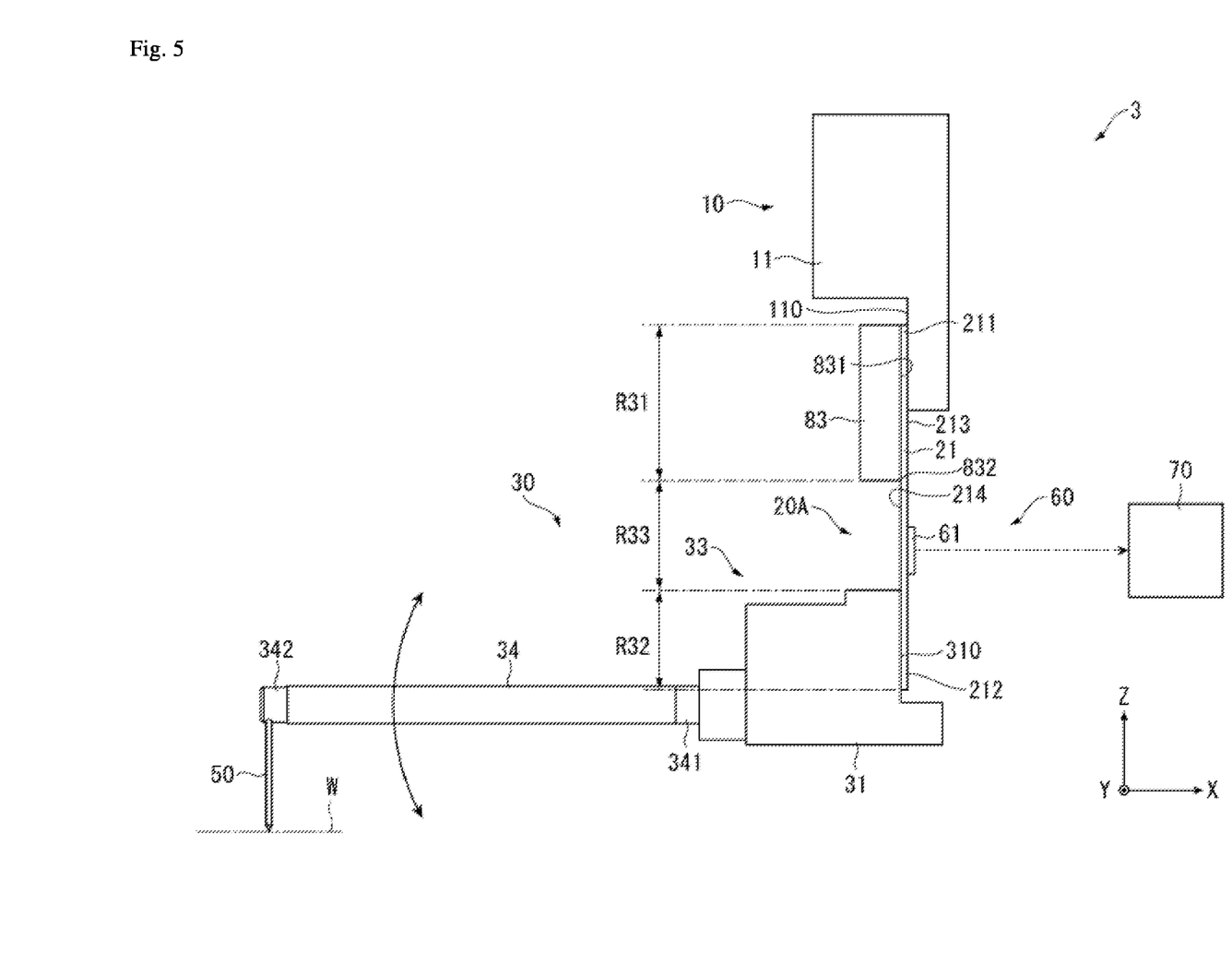
FIG. 5 is a schematic view illustrating a form measuring apparatus according to a third embodiment of the present invention.

FIG. 5 illustrates a form measuring apparatus 3 according to a third embodiment of the present invention. The form measuring apparatus 3 has the same basic structure as the form measuring apparatus 1 according to the first embodiment, described above. Therefore, duplicative descriptions of shared components are omitted and only those components that are differentiated are described below.

In the present embodiment, a coupling member 20A includes one or a plurality of the plate springs 21 arranged so as to follow the Z direction. However, the coupling portion 20A does not include the plate spring 22 (see FIG. 1) which is arranged so as to follow the X direction in the first embodiment, and the second base portion 12, the second arm portion 32, and the like to which the plate spring 22 is fixed are omitted.

The form measuring apparatus 3 according to the present embodiment includes a block-shaped confining member (limiter or restrictor) 83 that is provided to the base 10 instead of the distance adjustment mechanisms 81 and 82 (see FIG. 3) of the first embodiment. The confining member 83 includes a vertical support surface 831, which is a surface parallel to the YZ plane, and is in direct contact with the surface 214 of the plate spring 21. Also, the confining member 83 is fixed in place by a fixater such as a clamp or screw (not shown in the drawings), in a state where the plate spring 21 is sandwiched between the confining member 83 and the vertical support surface 110 of the first base portion 11.

The confining member 83 is arranged such that a bottom end 832 of the vertical support surface 831 is positioned lower than the vertical support surface 110 of the first base portion 11. Thereby, the confining member 83 is in direct contact with the surface 214 of the plate spring 21 at an upper portion of an area between the first base portion 11 and the first arm portion 31, and the confining member 83 limits the elastic deformation of the plate spring 21.

In such a configuration, the plate spring 21 is divided into a fixed region R31, where deformation is constrained by the confining member 83; a fixed region R32 where deformation is constrained by the first arm portion 31; and a deformation region R33 that is capable of elastic deformation, positioned between the fixed regions R31 and R32. In particular, in the present embodiment, the region where the confining member 83 makes direct contact with the plate spring 21 is excluded from the deformation region R33, and therefore an upper boundary of the deformation region R33 is defined by the bottom end 832 of the confining member 83.

In the present embodiment, by providing the confining member 83 to the plate spring 21, deformation of a Z direction portion of the plate spring 21 in an area between the first base portion 11 and the first arm portion 31 can be constrained and the Z direction length of the deformation region R33 of the plate spring 21 can be shortened. Accordingly, the amount of deformation of the deformation region R33 relative to the amount of displacement of the stylus 50 can be increased and the detection sensitivity for the displacement of the stylus 50 can be easily increased.

Also, the confining member 83 may also be configured to allow the placement of the confining member 83 relative to the coupling member 20 to be adjusted in the Z direction by reattachment or displacement relative to the plate spring 21. For example, a worker may have a plurality of confining members 83 having various Z direction lengths prepared, and may select a suitable confining member 83 and install the confining member 83 on the plate spring 21. The worker may also displace the confining member 83 installed on the plate spring 21 in the Z direction. With such a configuration, by adjusting the confining member 83 in the Z direction, not only is the upper boundary of the deformation region R33 modified, but the Z direction length of the deformation region R33 on the plate spring 21 is also modified. Accordingly, the detection sensitivity for the displacement of the stylus 50 can be readily adjusted.

Modifications

The present invention is not limited to the various embodiments described above, and includes modifications within a scope capable of achieving the advantages of the present invention. Also, the present invention includes combinations of the various embodiments described above.

In the first and second embodiments, the two distance adjustment mechanisms 81 and 82 are provided to the coupling member 20. However, the present invention is not limited to this, and only one of the distance adjustment mechanisms 81 and 82 may be provided to the coupling member 20 instead. Also, in the first and second embodiments, the distance adjustment mechanisms 81 and 82 are configured so as to enable the distance between the first base portion 11 and the first arm portion 31 to be adjusted, but the present invention is not limited to this. For example, when the distortion detecting element 61 is installed on the plate spring 22, the distance adjustment mechanisms 81 and 82 may be configured so as to enable the distance between the second base portion 12 and the second arm portion 32 to be adjusted. In the third embodiment, the distance adjustment mechanisms 81 and 82 may be provided instead of the confining member 83. Also, in the first and second embodiments, the confining member 83 may be provided instead of the distance adjustment mechanisms 81 and 82.

The specific configuration of a distance adjustment mechanism according to the present invention is not limited to that described in the first and second embodiments. For example, the distance adjustment mechanism according to the present invention may have a configuration that adjusts the position of the coupling member relative to at least one of the base and the arm.

The specific configuration of a placement adjustment mechanism according to the present invention is not limited to that described in the first and second embodiments. For example, the placement adjustment mechanism according to the present invention may have a configuration that adjusts the position of the coupling member relative to both the base and the arm.

A confining member according to the present invention should limit the elastic deformation of the coupling member 20 at a portion that is between the base 10 and the arm 30, and the specific configuration of the confining member is not limited to that described in the third embodiment. For example, in the third embodiment, the confining member 83 is fixed in place such that the plate spring 21 is sandwiched between the confining member 83 and the first base portion 11, but the present invention is not limited to this and the confining member may be fixed in place such that the plate spring 21 is sandwiched between the confining member 83 and the second base portion 12.

A coupling member according to the present invention is not limited to the at least one pair of plate springs 21 and 22 that are intersectingly arranged as in the first and second embodiments, nor to the plate spring 21 that is arranged in the Z direction as in the third embodiment. For example, in the first to third embodiments, the coupling members 20 and 20A may be configured by only the plate spring 22, which is arranged in the X direction. Also, the coupling member according to the present invention may be formed of an elastic material other than a plate spring, and may have the portion that configures the deformation region between the base and the arm formed of an elastic material.

In the first and third embodiments, the distortion detecting element 61 is installed on one surface (the surface 213) of the plate spring 21, but the present invention is not limited to this. The distortion detecting element 61 may be installed on the other surface 213, or may be installed on both surfaces 213 and 214, as in the second embodiment.

In the first and second embodiments, the distortion detecting elements 61 to 63 are installed on the plate spring 21 which is arranged in the Z direction, but the present invention is not limited to this. The distortion detecting elements 61 to 63 may be installed on the plate spring 22 which is arranged in the X direction, or may be installed on the plate springs 21 and 22 in each direction. Also, when a plurality of plate springs 21 (22) arranged in the same direction as each other are present, the distortion detecting elements 61 to 63 may be installed on one of the plurality of plate springs 21 (22), or a distortion detecting element may be installed on each individual respective plate spring of the plurality of plate springs separately. In the second embodiment, one pair of the distortion detecting elements 63 are installed on each of the plate springs 21, but two or more pairs of the distortion detecting elements 63 may be installed on each of the plate springs 21.

In the second embodiment, the driver 90 is a pair of bimorph-type piezoelectric elements installed on the surfaces 213 and 214 on both sides of the plate spring 21, but the present invention is not limited to this and the driver 90 may also be a piezoelectric element that is installed on either one of the surfaces 213 and 214 of the plate spring 21. Also, rather than being installed on the plate spring 21 which is arranged in the Z direction, the driver 90 may be installed on the plate spring 22 which is arranged in the X direction, or on both the plate springs 21 and 22.

In addition, in the second embodiment, the distortion detector 60 and the driver 90 are respectively configured by individual piezoelectric elements, but the distortion detector 60 and the driver 90 may also be achieved by the same piezoelectric element.

The present invention can be used in a form measuring apparatus that measures a surface form of a work piece.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A form measuring apparatus comprising:
a base;
an arm configured to swing relative to the base;
a coupler that couples the base and the arm, the coupler having a deformation region that is capable of elastic deformation between the base and the arm; and
a distortion detector installed in the deformation region.

2. The form measuring apparatus according to claim 1, further comprising a distance adjuster that adjusts a distance between the base and the arm, wherein the coupler is formed of an elastic material.

3. The form measuring apparatus according to claim 2, further comprising a placement adjuster that adjusts a position of the distortion detector within the deformation region in the coupling direction of the base and the arm.

4. The form measuring apparatus according to claim 3, wherein the coupler comprises at least one plate spring, a middle portion of which comprises the deformation region.

5. The form measuring apparatus according to claim 4, wherein the at least one plate spring is least one pair of plate springs that are intersectingly arranged with each other.

6. The form measuring apparatus according to claim 4, wherein the distortion detector comprises a pair of piezoelectric elements installed on opposing surfaces of the at least one plate spring such that the at least one plate spring is sandwiched between the pair of piezoelectric elements.

7. The form measuring apparatus according to claim 2, wherein the coupler comprises at least one plate spring, a middle portion of which comprises the deformation region.

8. The form measuring apparatus according to claim 7, wherein the at least one plate spring is least one pair of plate springs that are intersectingly arranged with each other.

9. The form measuring apparatus according to claim 7, wherein the distortion detector comprises a pair of piezoelectric elements installed on opposing surfaces of the at least one plate spring such that the at least one plate spring is sandwiched between the pair of piezoelectric elements.

10. The form measuring apparatus according to claim 1, further comprising a placement adjuster that adjusts a position of the distortion detector within the deformation region in the coupling direction of the base and the arm.

11. The form measuring apparatus according to claim 10, wherein the coupler comprises at least one plate spring, a middle portion of which comprises the deformation region.

12. The form measuring apparatus according to claim 11, wherein the at least one plate spring is least one pair of plate springs that are intersectingly arranged with each other.

13. The form measuring apparatus according to claim 11, wherein the distortion detector comprises a pair of piezoelectric elements installed on opposing surfaces of the at least one plate spring such that the at least one plate spring is sandwiched between the pair of piezoelectric elements.

14. The form measuring apparatus according to claim 1, further comprising a limiter that constrains elastic deformation of the coupler in a portion between the base and the arm, wherein the coupler is formed of an elastic material.

15. The form measuring apparatus according to claim 14, wherein the coupler comprises at least one plate spring, a middle portion of which comprises the deformation region.

16. The form measuring apparatus according to claim 15, wherein the at least one plate spring is least one pair of plate springs that are intersectingly arranged with each other.

17. The form measuring apparatus according to claim 15, wherein the distortion detector comprises a pair of piezoelectric elements installed on opposing surfaces of the at least one plate spring such that the at least one plate spring is sandwiched between the pair of piezoelectric elements.

18. The form measuring apparatus according to claim 1, wherein the coupler comprises at least one plate spring, a middle portion of which comprises the deformation region.

19. The form measuring apparatus according to claim 18, wherein the at least one plate spring is least one pair of plate springs that are intersectingly arranged with each other.

20. The form measuring apparatus according to claim 18, wherein the distortion detector comprises a pair of piezoelectric elements installed on opposing surfaces of the at least one plate spring such that the at least one plate spring is sandwiched between the pair of piezoelectric elements.

21. The form measuring apparatus according to claim 1, further comprising:
   a driver that is installed in the deformation region and that drives deformation of the coupler.

\* \* \* \* \*